United States Patent
Stec et al.

(10) Patent No.: US 8,339,462 B2
(45) Date of Patent: Dec. 25, 2012

(54) METHODS AND APPARATUSES FOR ADDRESSING CHROMATIC ABBERATIONS AND PURPLE FRINGING

(75) Inventors: Piotr Stec, Galway (IE); Larry Murray, Galway (IE); Alexandru Drimbarean, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 463 days.

(21) Appl. No.: 12/360,665

(22) Filed: Jan. 27, 2009

(65) Prior Publication Data

US 2009/0189997 A1     Jul. 30, 2009

Related U.S. Application Data

(60) Provisional application No. 61/023,946, filed on Jan. 28, 2008, provisional application No. 61/024,274, filed on Jan. 29, 2008.

(51) Int. Cl.
*H04N 17/00* (2006.01)
*H04N 17/02* (2006.01)
*H04N 5/228* (2006.01)

(52) U.S. Cl. ..................... 348/187; 348/222.1

(58) Field of Classification Search .................. 348/187, 348/188
See application file for complete search history.

(56) References Cited

U.S. PATENT DOCUMENTS

| | | | |
|---|---|---|---|
| 5,315,413 A | 5/1994 | Yamamoto et al. | |
| 5,477,345 A | 12/1995 | Tse | |
| 6,466,232 B1 | 10/2002 | Newell et al. | |
| 6,874,127 B2 | 3/2005 | Newell et al. | |
| 6,881,718 B1 | 4/2005 | FitzGerald et al. | |
| 7,003,139 B2 | 2/2006 | Endrikhovski et al. | |
| 7,046,924 B2 | 5/2006 | Miller et al. | |
| 7,142,238 B1 * | 11/2006 | Sawada et al. | 348/252 |
| 7,206,022 B2 | 4/2007 | Miller et al. | |
| 7,218,793 B2 | 5/2007 | Perlmutter et al. | |
| 7,233,684 B2 | 6/2007 | Fedorovskaya et al. | |
| 7,243,945 B2 | 7/2007 | Breed et al. | |
| 7,245,319 B1 * | 7/2007 | Enomoto | 348/222.1 |

(Continued)

FOREIGN PATENT DOCUMENTS

EP     2293582 A2     3/2011

(Continued)

OTHER PUBLICATIONS

PCT Notification of Transmittal of the International Search Report and Written Opinion of the International Searching Authority, or the Declaration, for PCT Application No. PCT/EP2009/050967, mailed on Oct. 16, 2009, 12 pages.

(Continued)

*Primary Examiner* — Albert Cutler
(74) *Attorney, Agent, or Firm* — Andrew V. Smith

(57) ABSTRACT

Methods and systems for detecting and correcting chromatic aberration and purple fringing are disclosed. Chromatic aberration can be addressed by separating an image into color planes and then adjusting these to reduce chromatic aberration by using a specific calibration image (calibration chart) as an empirical method to calibrate the image acquisition device. Purple fringing can be corrected by initially addressing color aberration resulting from the lateral chromatic aberration (LCA). The LCA is first removed and then the correction is extended to purple fringing. A discovery is relied upon that the purple fringing is created in the direction of the chromatic aberration and is more pronounced in the direction of the chromatic aberration.

30 Claims, 11 Drawing Sheets
(11 of 11 Drawing Sheet(s) Filed in Color)

U.S. PATENT DOCUMENTS

| | | |
|---|---|---|
| 7,271,809 B2 | 9/2007 | Fedorovskaya et al. |
| 7,283,162 B2 | 10/2007 | Silverbrook et al. |
| 7,307,636 B2 | 12/2007 | Matraszek et al. |
| 7,319,780 B2 | 1/2008 | Fedorovskaya et al. |
| 7,327,505 B2 | 2/2008 | Fedorovskaya et al. |
| 7,327,890 B2 | 2/2008 | Fredlund |
| 7,349,010 B2 | 3/2008 | Bryant et al. |
| 7,369,164 B2 | 5/2008 | Parulski et al. |
| 7,369,917 B2 | 5/2008 | Ravish et al. |
| 7,577,292 B2 | 8/2009 | Kang |
| 8,089,555 B2 * | 1/2012 | Vakrat et al. ............ 348/360 |
| 2002/0051639 A1* | 5/2002 | Enomoto ............ 396/311 |
| 2003/0128389 A1 | 7/2003 | Matraszek et al. |
| 2003/0206179 A1 | 11/2003 | Deering |
| 2004/0101212 A1 | 5/2004 | Fedorovskaya et al. |
| 2006/0256382 A1 | 11/2006 | Matraszek et al. |
| 2007/0166025 A1 | 7/2007 | Chang |
| 2007/0201731 A1 | 8/2007 | Fedorovskaya et al. |
| 2007/0242945 A1 | 10/2007 | Fredlund et al. |

FOREIGN PATENT DOCUMENTS

| | | |
|---|---|---|
| JP | 2006-115039 A | 4/2006 |
| JP | 2009-522869 A | 6/2009 |
| WO | 2007/079039 A2 | 7/2007 |
| WO | 2009/095422 A2 | 8/2009 |
| WO | 2009/095422 A3 | 12/2009 |

OTHER PUBLICATIONS

John Mallon et al., Calibration and removal of lateral chromatic aberration in images, Pattern Recognition Letters, 2007, pp. 125-135, vol. 28—Issue 1.

PCT Partial International Search Report for Application No. PCT/EP2009/050967, dated Jul. 31, 2009, 4 pages.

International Preliminary Report on Patentability Chapter I, for PCT Application No. No. PCT/EP2009/050967, dated Aug. 3, 2010, 8 pages.

Written Opinion of the International Search Authority, for PCT Application No. No. PCT/EP2009/050967, dated May 25, 2011, 7 pages.

Patent Abstracts of Japan, publication No. 2006-115039, published on Apr. 27, 2006, Image Processor, Image Processing Method and Computer Program.

* cited by examiner

METHODS AND APPARATUSES FOR ADDRESSING CHROMATIC ABBERATIONS AND PURPLE FRINGING

RELATED APPLICATIONS

This application claims the benefit of priority to U.S. provisional patent application No. 61/023,946, filed Jan. 28, 2008, entitled, "Methods and Apparatuses For Addressing Chromatic Aberrations and Purple Fringing," and U.S. provisional patent application No. 61/024,274, filed Jan. 29, 2008, entitled, "Methods and Apparatuses for Addressing Purple Fringing," which are hereby incorporated by reference.

FIELD

Embodiments of the invention relate generally to the field of correcting chromatic aberrations and purple fringing in digital images.

BACKGROUND

The refractive index of any medium other than a vacuum varies with wavelength. Thus the Gaussian and aberrational properties of any refracting optical system are functions of wavelength, i.e. Chromatic aberrations exist. Many modern refracting systems intended for use over an appreciable range of wavelengths are ultimately limited in performance by chromatic effects, both Gaussian and higher order. The history of astronomical telescope design provides a useful example. Sir Isaac Newton invented the reflecting telescope because he considered that it was impossible to correct for the chromatic effects in singlet lenses by combining two to form what we now call an achromatic doublet; in effect he thought that the chromatic effect of all lenses were proportional to their powers, with the same constant of proportionality even for different glasses. Then, in the middle of the eighteenth century, John Dollond and Chester Moore Hall showed that Newton had been wrong and they made achromatic doublets. This resulted in larger and larger telescope doublet objectives being made. However, as objectives became larger and design techniques became subtler it was found that an "achromatic" doublet was not quite free from chromatic aberration and a residual error, known as "secondary spectrum", appeared.

As mentioned, when different colors of light propagate at different speeds in a medium, the refractive index is wavelength dependent. This phenomenon is known as dispersion. A well-known example is the glass prism that disperses an incident beam of white light into a rainbow of colors. Photographic lenses comprise various dispersive, dielectric glasses. These glasses do not refract all constituent colors of incident light at equal angles, and great efforts may be required to design an overall well-corrected lens that brings all colors together in the same focus. Chromatic aberrations are those departures from perfect imaging that are due to dispersion. Whereas the Seidel aberrations are monochromatic, i.e. they occur also with light of a single color; chromatic aberrations are only noticed with polychromatic light.

Axial Chromatic Aberrations

One discriminates between two types of chromatic aberration. Axial color aberration (ACA) also known as longitudinal color aberration, is the inability of a lens to focus different colors in the same focal plane. For a subject point on the optical axis the foci of the various colors are also on the optical axis, but displaced in the longitudinal direction (i.e. along the axis). This behavior is elucidated in FIGS. 1A-1B for a distant light source. In this sketch, only the green light is in sharp focus on the sensor. The blue and red light have a so-called circle of confusion in the sensor plane and are not sharply imaged. FIG. 1B illustrates the origins of longitudinal chromatic aberration. FIG. 1B shows that focal planes of three of the various colors do not coincide.

In practical applications if there is a fringe near the image center that changes color if when the image is defocused slightly, this is most likely longitudinal chromatic aberration. This type cannot be corrected using conventional software, it decreases if stopped down, and it is dependent from focus distance.

Lateral Chromatic Aberrations

Obliquely incident light leads to the transverse chromatic aberration, also known as lateral color. It refers to sideward displaced foci. In the absence of axial color, all colors are in focus in the same plane, but the image magnification depends on the wavelength. The occurrence of lateral color implies that the focal length depends on the wavelength, whereas the occurrence of axial color in a complex lens does not strictly require a variable focal length. This seems counterintuitive, but in a lens corrected for longitudinal chromatic aberration the principal planes do not need to coincide for all colors. Since the focal length is determined by the distance from the rear principal plane to the image plane, the focal length may depend on the wavelength even when all images are in the same plane. FIG. 1C illustrates the origins of lateral chromatic aberration. The size of the image varies from color to color. The red image is magnified more than the green image, and both the red and green images are magnified more than the blue image.

In summary, when a lens is corrected for longitudinal chromatic aberration, different colors focus more or less in the same point on the optical axis, but they might focus in different distances off axis resulting in images of different size for different colors. This type is called lateral or transverse chromatic aberration (TCA).

In practical terms, if there are complementary colored fringes progressively more from the center to the corners, this is most likely transverse chromatic aberration. This type can be corrected by software, it does not change by stopping down, and it is independent from focus distance. FIG. 1D is a schematic showing a comparison of occurrences of ACA and LCA. FIGS. 1B-1C distinguish two simplified cases because in practice the axial and lateral components are coexistent. A polychromatic subject fills a volume in the image space, which is comprised of a continuum of monochromatic images of various sizes and positions. Lateral color is particularly manifest in telephoto and reversed telephoto (retrofocus) lenses. Chromatic aberrations often limit the performance of otherwise well-corrected telephoto designs. The archetypal manifestation of chromatic aberrations is color fringing along boundaries that separate dark and bright parts of the image. This said, descriptions of the perceptible effects of chromatic aberrations do vary in literature. It is read that lateral color is a more serious aberration than axial color, because the former gives rise to colored fringes while the latter merely reduces the sharpness. Oberkochen holds a different view and points to axial color as the most conspicuous color aberration. Hecht describes the cumulative effect of chromatic aberrations as a whitish blur or hazed overlap. The residual color errors of an optical system with achromatic (under) correction for axial color lead to a magenta halo or blur around each image point.

Purple Fringing

Another related problem with digital images is purple fringing. This fringing effect may be of colors other than purple, but is commonly known as purple fringing as it is commonly exhibited in that color. Purple fringing strength is often correlated with chromatic aberration. Fringes are often formed in the direction of the chromatic aberration displacement vectors. Although the exact origins of fringing are unclear one of the more widely accepted explanations of purple fringing is that it is a result of sensor blooming. Blooming is a phenomenon which arises when a sensor pixel is saturated and charge leaks to one or more neighboring pixels. FIGS. 6A-6B illustrate that in an ideal imaging system, a green value of 255 is expected at a center pixel while surrounding pixels would have values of zero, while charge leakage along detector rows or columns as indicated by the arrows will raise the red and blue sensor responses above the correct values.

When charge leaks from one photodiode well into surrounding photodiode wells, the result is a spuriously higher signal in the surroundings. That spurious signal will be particularly noticeable if the surrounding sensors should be producing no signal because the scene is dark in these regions. In other words, we might expect to see the effect of blooming most strongly at sharp transitions from light to dark. It has been noted that lens aberrations will cause the blue and red components of bright white light to appear at incorrect sensor positions. Charge leakage magnifies this effect by spreading the sensor response further from the true position, and the positional error is additionally propagated by demosaicing. The effect of how sensor blooming will appear in an image can be considered. With a very bright white point in the scene surrounded by darkness, for instance a distant street light in a night scene, and the light from this point falls on a green sensor. Therefore, a high value of green would be expected at this sensor and low values for the surrounding sensors, theoretically. However, charge leakage along detector rows or columns as shown by the arrows will raise the red and blue sensor responses above the correct value. Our perception of lightness can be roughly estimated as 30% red plus 59% green and 11% blue. Consequently the enhanced red and blue values contribute little to increasing the brightness of the image but give it a purple hue. If light from the point was incident on a red sensor instead of a green one, leakage of charge would increase green values. While this would change the hue somewhat, the main contribution would be an increase in lightness since green contributes so heavily to the perception of lightness. (The same holds true for a blue sensor, of course.) Thus, sensor blooming leads to a spurious purple color in darker regions of the image and—if purple is defined generally as varying mixtures of red and blue—this is borne out in reality so that the effect is often referred to as purple fringing. FIGS. 2A-2C and FIGS. 3A-3D.

It is possible for the same image to contain multiple aberration colors as sensor blooming interacts with lens aberration and interpolation errors. The strength of the blooming effect is strongly dependent on brightness as expected from its origin.

Since sensor blooming augments any lens chromatic aberration, it is not uncommon to find higher levels of the blooming defect where we would expect to find a lens aberration defect.

When charge leaks from one photodiode well into surrounding photodiode wells, the result is a spuriously higher signal in the surroundings. That spurious signal will be particularly noticeable if the surrounding sensors should be producing no signal because the scene is dark in these regions. In other words, we might expect to see the effect of blooming most strongly at sharp transitions from light to dark. Lens aberrations will cause blue and red components of bright white light to appear at incorrect sensor positions. Charge leakage magnifies this effect by spreading the sensor response further from the true position, and the positional error is additionally propagated by de-mosaicing. The effect of how sensor blooming will appear in an image can be considered. With a very bright white point in the scene surrounded by darkness, for instance a distant street light in a night scene, and the light from this point falls on a green sensor. As shown in FIGS. 6A-6B, in a perfect imaging system we expect a value of green 255 at this sensor and values of zero for the surrounding sensors.

However, charge leakage along detector rows or columns as shown by the arrows will raise the red and blue sensor responses above the correct value. Our perception of lightness can be roughly estimated as 30% red plus 59% green and 11% blue. Consequently the enhanced red and blue values contribute little to increasing the brightness of the image but give it a purple hue. If light from the point were incident on a red sensor instead of a green one, we would have the situation on the right of the diagram. Leakage of charge would increase green values. While this would change the hue somewhat, the main contribution would be an increase in lightness since green contributes so heavily to the perception of lightness. (The same holds true for a blue sensor, of course.) Thus, we would expect sensor blooming to lead to a spurious purple color in darker regions of the image and—if we define purple broadly as varying mixtures of red and blue—this is borne out in reality so that the effect is often referred to as purple glow or purple fringing.

It is possible for the same image to contain multiple aberration colors as sensor blooming interacts with lens aberration and interpolation errors. The image of FIG. 3E is an extreme but real example.

The strength of the blooming effect is strongly dependent on brightness as expected from its origin as illustrated at FIGS. 2A-2C. However, the effect can still be present to a reduced degree at lower brightness levels if there is a large brightness difference. This is shown in the next image, where a distinct and broad purple-blue band appears across a large brightness transition, but which is absent where the transition is small. Where there is a medium brightness difference, a weak barely perceptible narrow blue band can be seen.

Since sensor blooming augments any lens chromatic aberration, it is not uncommon to find higher levels of the blooming defect where we would expect to find a lens aberration defect. Image corners are often the best place to look for a blooming effect if there is high contrast in those areas. A common case where this is encountered is tree branches against the sky. FIGS. 3A-3B respectively illustrate an image with purple fringing around edges of leaves on a tree and a processed version of the image with the purple fringing reduced or removed, while FIGS. 3C-3D respectively illustrate an image with purple fringing around a bar code label and a processed version of the bar code label image with the purple fringing reduced or removed.

SUMMARY OF THE INVENTION

A processor-implemented method is provided for correcting lateral chromatic aberrations in digital images within a digital image acquisition device. The method includes calibrating a camera-lens pair, and acquiring a digital image. Lateral chromatic aberrations are corrected within the digital image, including the following: (1) finding and storing in a temporary buffer a displacement for a current pixel. The displacement is designated as a relative position in a source buffer. A displacement value is interpolated and stored in the temporary buffer. The process is performed for multiple pixels. The method further involves outputting, storing, displaying, projecting, or transmitting a corrected digital image which has been corrected for lateral chromatic aberrations, or a further processed version of the digital image, or combinations thereof.

The calibrating may include detecting measurement points of a test image, measuring aberration, and interpolating scattered data. The measuring of aberration may include thresholding. The calibrating may include finding and storing first and second data points in a first dimension, applying linear interpolation to empty points between the first and second data points, substituting value of second point to value of first point, incrementing a second dimension and repeating one or more times.

The interpolating may include applying a sinc filter. The since filter may be a 5×5 sinc filter.

Another processor-implemented method if provided for correcting lateral chromatic aberrations in digital images within a digital image acquisition device. A digital image is acquired. Corrected values are calculated for red (R) and blue (B) color channels as follows:

$R'=R+(G-R)\times corR$; $B'=B+(G-B)\times corB$; where corR and corB are selected correction ratios for the red and blue color channels, respectively. A corrected digital image which has been corrected for lateral chromatic aberrations, and/or a further processed version of the digital image is/are output, stored, displayed, projected, and/or transmitted. The selected correction ratios corR and corB may be determined as follows:

$$CorR=\{CR=0.1\times \text{clamp}\,([R(x,y)-RC(x,y)],10)\}\times CRB;$$
$$\text{and}$$

$$CorB=\{CB=0.1\times \text{clamp}\,([B(x,y)-BC(x,y)],10)\}\times CRB;$$

where clamp (.,.) returns second term when first term exceeds it; and $$CRB=1+\cos\,[abs(Rc(x,y)-Bc(x,y))\pi/200,\text{ when }abs\,(Rc(x,y)-Bc(x,y))\leq 200;\text{ and}$$

$$CRB=0\text{ when }abs(Rc(x,y)-Bc(x,y))<200.$$

The method may also involve applying color corruption correction when G<R' and R'<B'.

The interpolating may include selecting a pixel neighborhood and performing the method in a single pass.

Another processor-implemented method is provided for correcting lateral chromatic aberrations in digital images within a digital image acquisition device. A digital image is acquired. Vertical and horizontal gradients are calculated for each color component. Correction ratios are calculated based on a dot product between color component gradient and vector formed by a pixel position and image center. New red R' and blue B' color values are calculated using linear interpolation between current red R and blue B values and green G value using respective correction ratios. A corrected digital image which has been corrected for lateral chromatic aberrations, and/or a further processed version of the digital image is/are output, stored, displayed, projected, and/or transmitted. The correction ratios may be determined as follows:

$$R\text{corr}=(x\cdot \text{Grad}x(R)+y\cdot \text{Grad}y(R))/(abs[x2+y2]\cdot R\text{norm};$$
$$\text{and}$$

$$B\text{corr}=(x\cdot \text{Grad}x(B)+y\cdot \text{Grad}y(B))/(abs[x2+y2]\cdot B\text{norm};$$
$$\text{where}$$

$$R\text{norm}=1+abs\text{Grad}(G)+\max(G,R-\min(B,G));\text{ and}$$

$$B\text{norm}=1+abs\text{Grad}(G)+\max(G,B-\min(R,G));\text{ where}$$

$abs\text{Grad}(G)$ comprises a length of a green gradient vector.

The new red R' and blue B' color values may be determined as follows:

$$R'=R\cdot(1-R\text{corr})+G\cdot R\text{corr; and}$$

$$B'=B\cdot(1-B\text{corr})+G\cdot B\text{corr}.$$

One or more processor readable media is/are also provided having code embedded therein for programming a processor to perform any of the methods for correcting lateral chromatic aberrations in digital images recited above and below herein.

A portable digital image acquisition device is also provided with a lens, an image sensor, a processor, and one or more processor readable media having code embedded therein for programming the processor to perform any of the methods described herein.

BRIEF DESCRIPTION OF THE DRAWINGS

Statement Regarding Color Drawings

The patent or application file contains at least one drawing executed in color. Copies of this patent or patent application publication with color drawing(s) will be provided by the Office upon request and payment of the necessary fee.

The invention may be best understood by referring to the following description and the accompanying drawings that are used to illustrate embodiments of the invention.

Figure 1A:
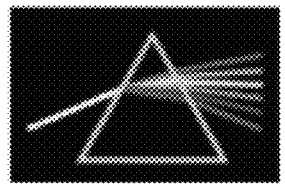

FIG. 1A illustrates the wavelength dependence of the refractive nature of light.

Figure 1B:
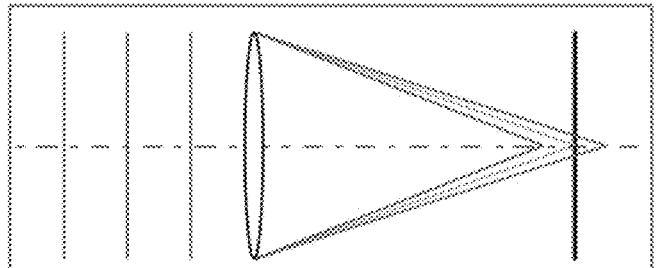

FIG. 1B illustrates the wavelength dependence of axial or longitudinal chromatic aberrations, wherein the focal planes for different colors of light incident on a focusing lens do not coincide.

Figure 1C:
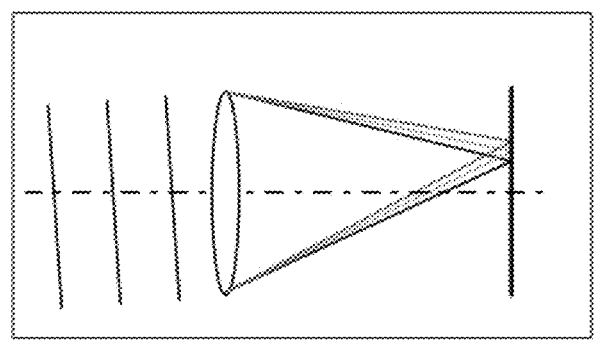

FIG. 1C illustrates the wavelength dependence of transverse or lateral chromatic aberrations, wherein the sizes of images for different colors vary.

Figure 1D:
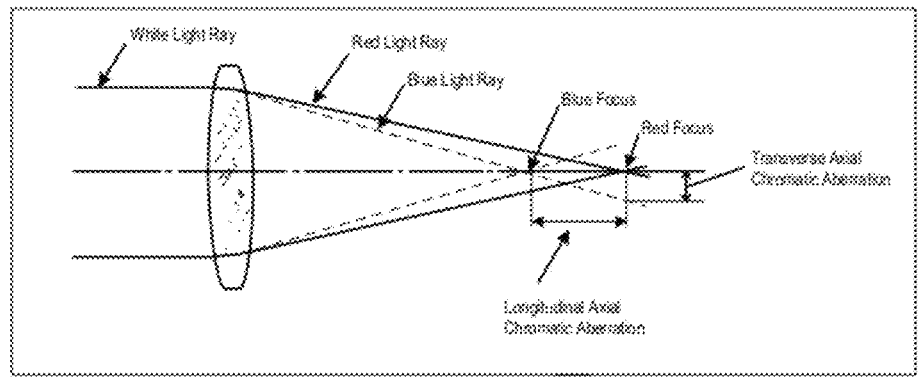

FIG. 1D comparatively illustrates axial and lateral chromatic aberrations.

Figure 2A:
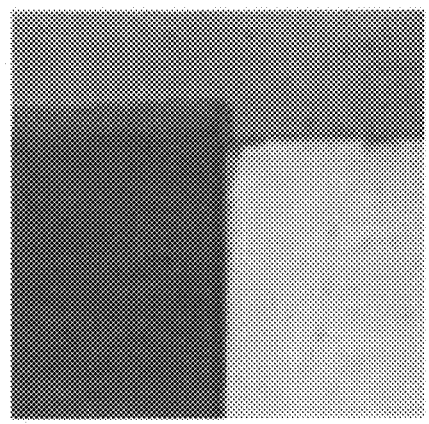
Figure 2B:
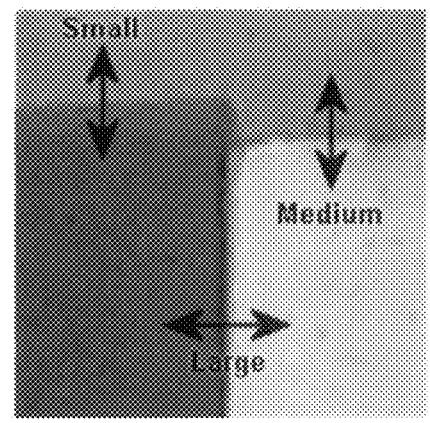
Figure 2C:
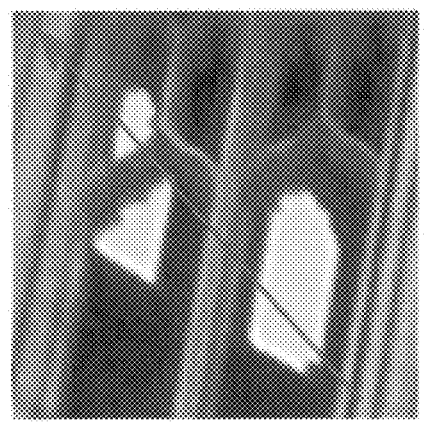

FIGS. 2A-2C illustrate effects of brightness differences on purple fringing and the blooming effect.

Figure 3A:
Figure 3B:

FIGS. 3A-3B respectively illustrate an image with purple fringing around edges of leaves on a tree and a processed version of the image with the purple fringing reduced or removed.

Figure 3C:
Figure 3D:
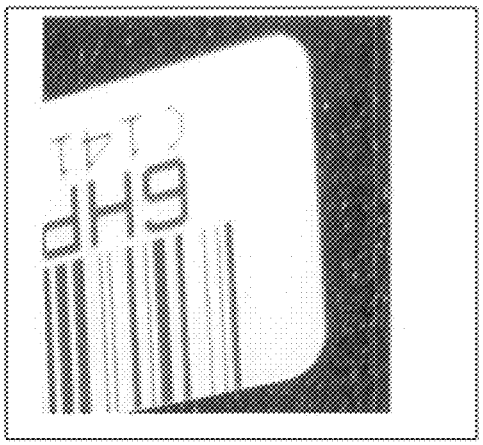

FIGS. 3C-3D respectively illustrate an image with purple fringing around a bar code label and a processed version of the image with the purple fringing reduced or removed.

Figure 3E:
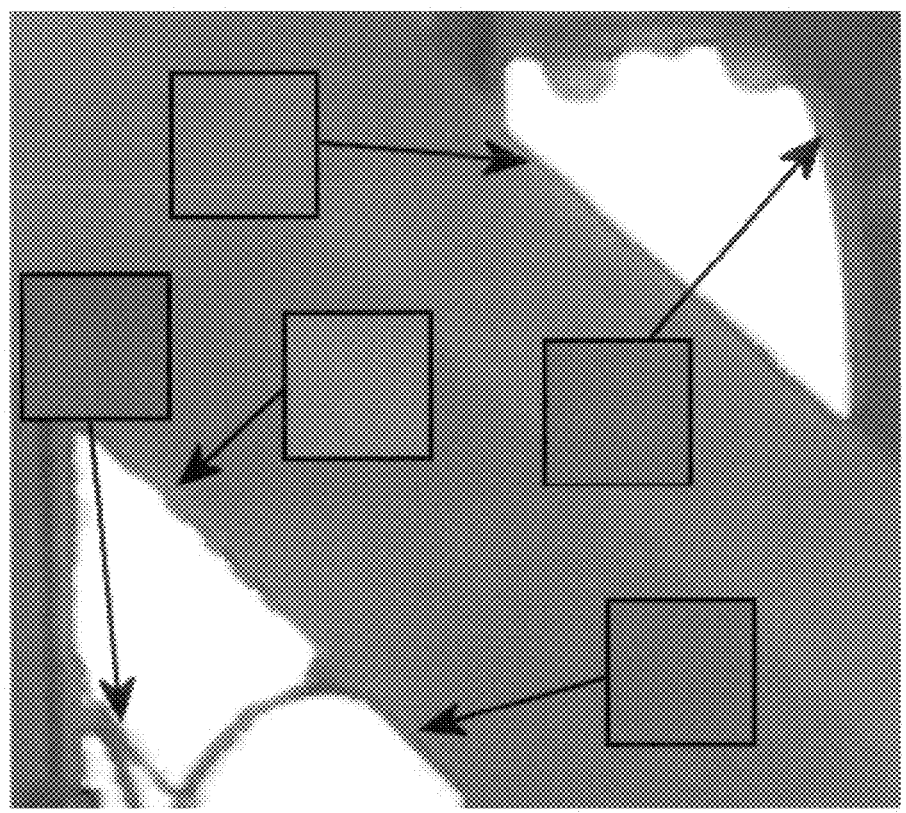

FIG. 3E illustrates an image with multiple aberration colors as sensor blooming interacts with lens aberration and interpolation errors.

Figure 4A:
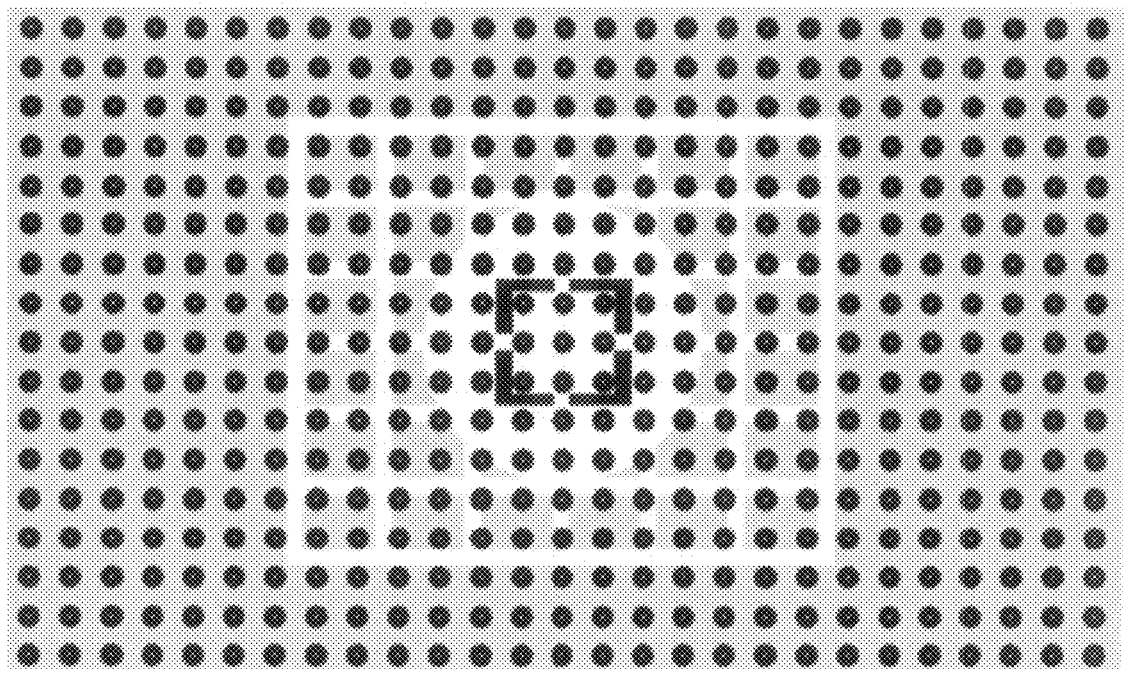

FIG. 4A illustrates a crop of a central region of a test target used to calibrate for chromatic aberration correction.

Figure 4B:
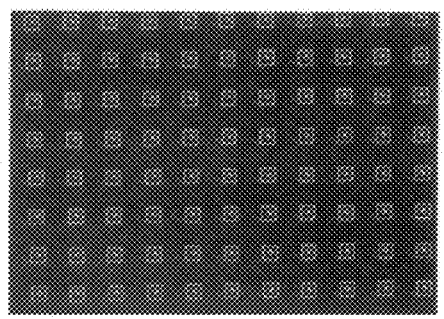

FIG. 4B illustrates spots from a test target surrounded by yellow regions of interest and with marked red and blue displacements (red and blue lines respectively).

Figure 4C:
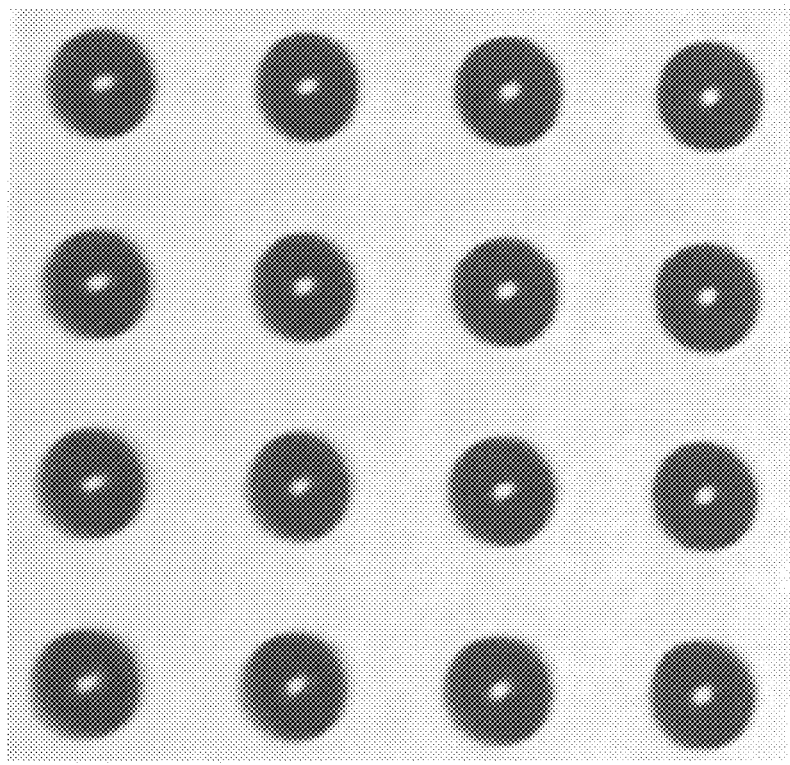

FIG. 4C illustrates lateral chromatic aberration in color displacements of white spots and around black circles in a target.

Figure 4D:
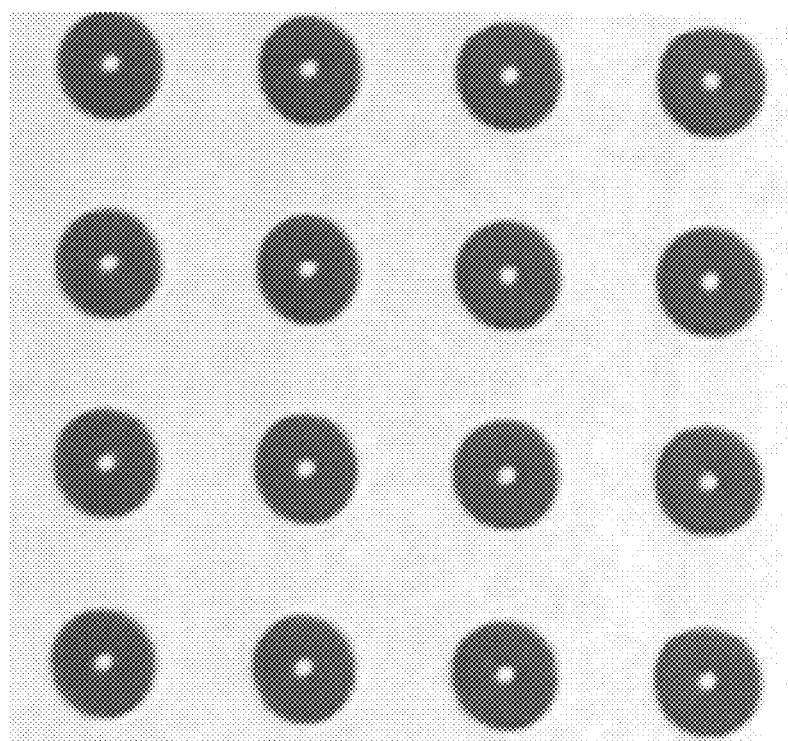

FIG. 4D illustrates a processed version of FIG. 4C with the color displacements corrected in the white spots and around the black circles.

Figure 5A:
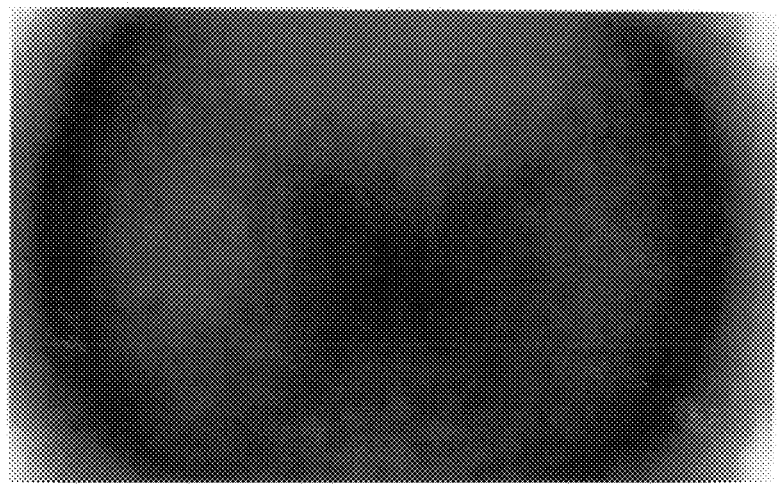
Figure 5B:
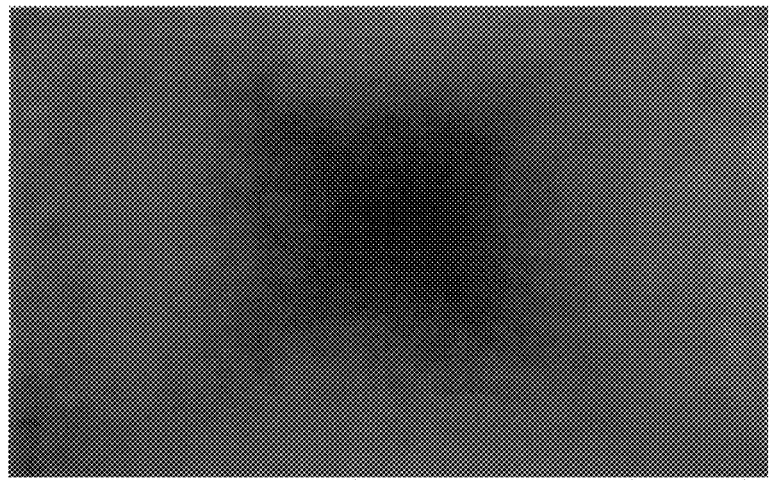

FIGS. 5A-5B illustrate aberration maps showing magnitude of color misalignment calculated for color shifts for blue in FIG. 5A and red in FIG. 5B with respect to the green channel for a focal length of 18 mm and F#5 aperture.

Figure 6A:
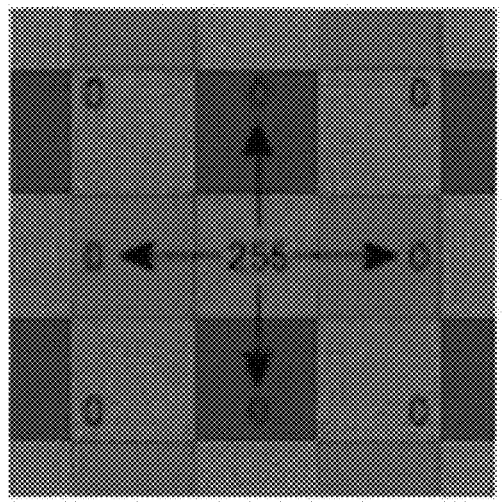
Figure 6B:
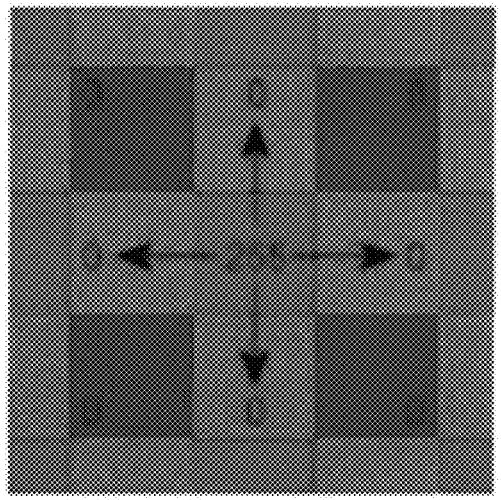

FIGS. 6A-6B illustrate that in an ideal imaging system, a green value of 255 is expected at a center pixel while surrounding pixels would have values of zero, while charge leakage along detector rows or columns as indicated by the arrows will raise the red and blue sensor responses above the correct values.

Figure 7:
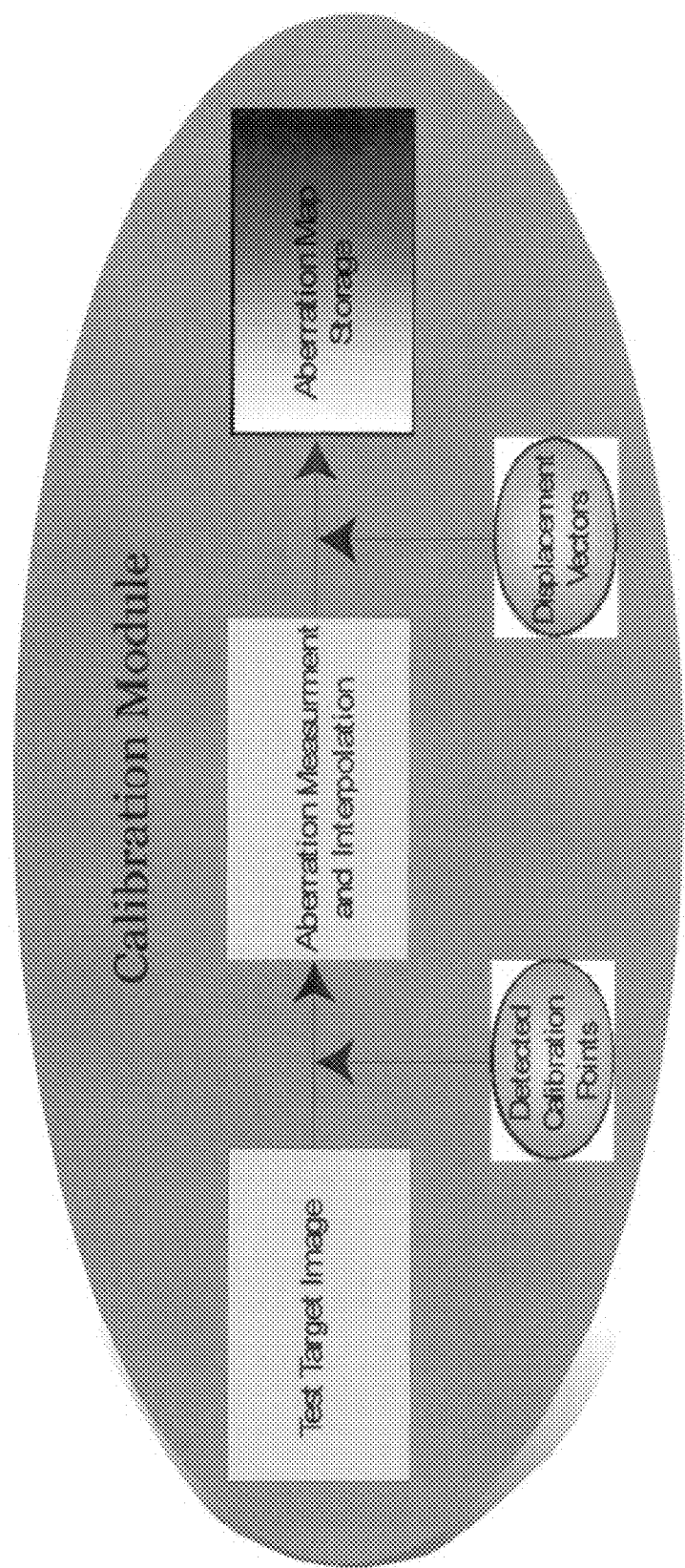

FIG. 7 is a block diagram illustrating an example of a calibration module in accordance with certain embodiments.

Figure 8:
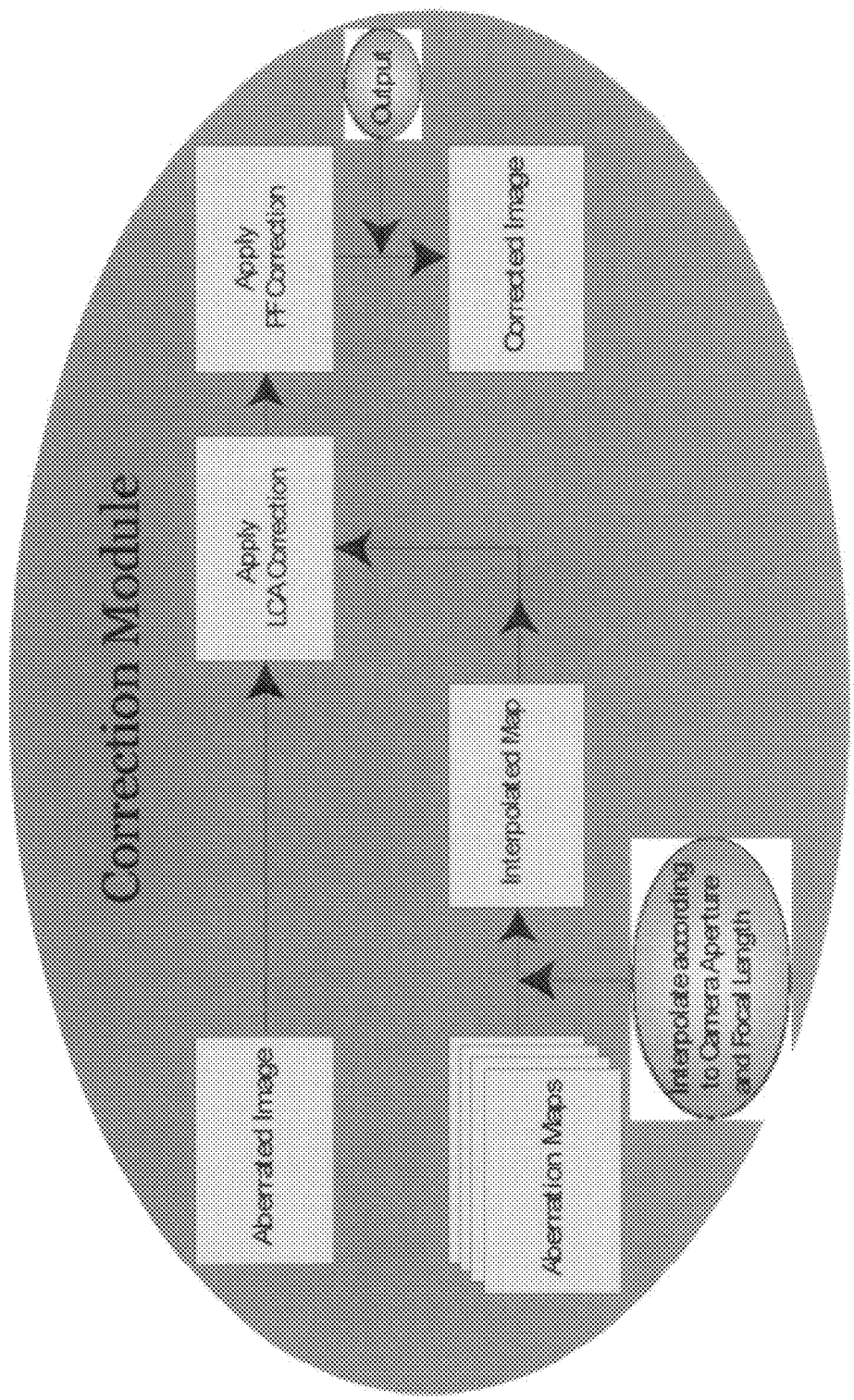

FIG. 8 is a block diagram illustrating an example of a correction module in accordance with certain embodiments.

Figure 9:
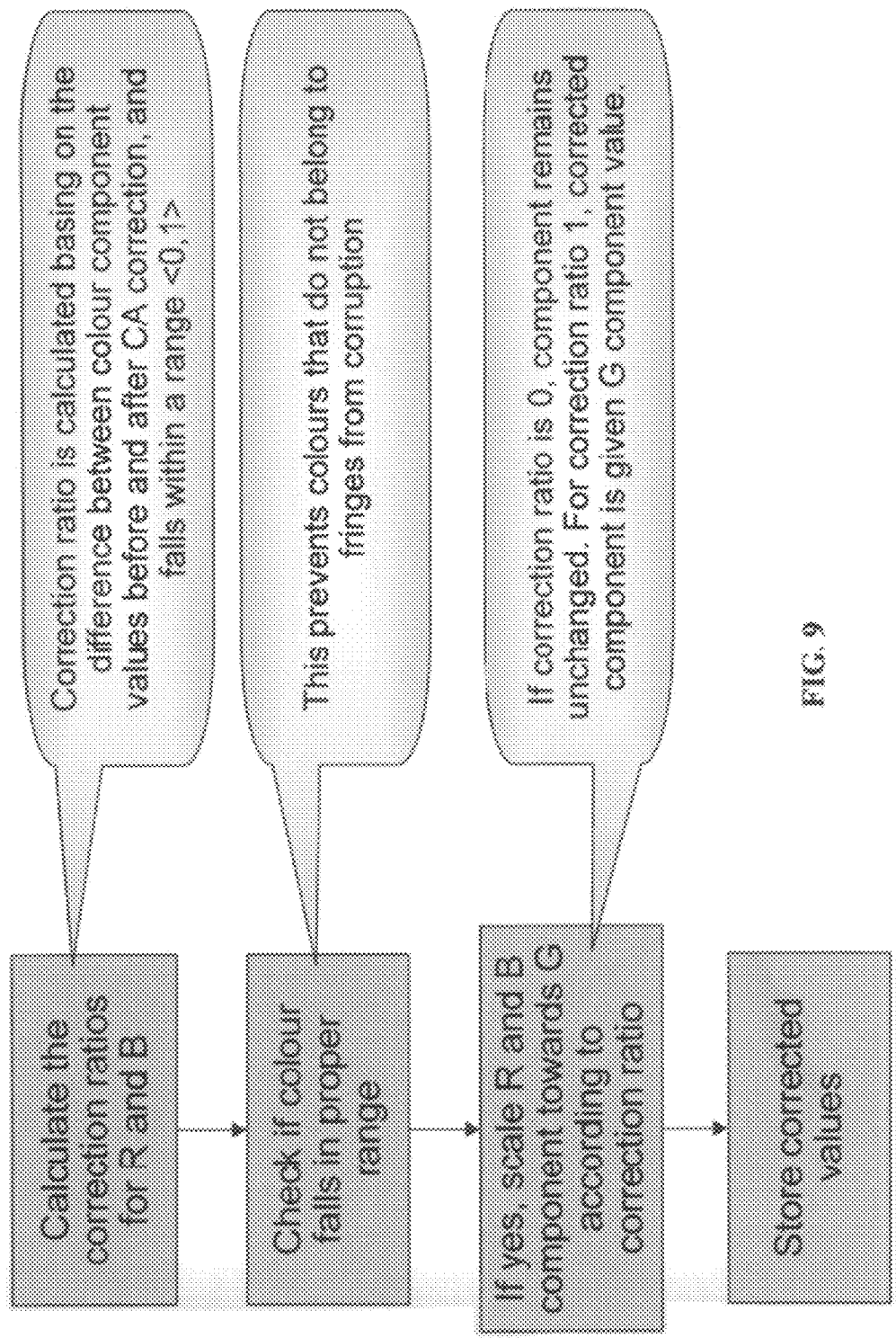

FIG. 9 is a flow diagram illustrating an example of a purple fringing correction process in accordance with certain embodiments.

DETAILED DESCRIPTIONS of SEVERAL EMBODIMENTS

Systems and methods for detecting and correcting chromatic aberrations including fringing (e.g., purple fringing) are described.

In certain embodiments, chromatic aberration is addressed by separating an image into color planes and then adjusting these to reduce chromatic aberration by using a specific calibration image (calibration chart) as an empirical method to calibrate the image acquisition device. Purple fringing is also corrected by initially addressing the color aberration resulting from the lateral chromatic aberration (LCA). The LCA is first removed and then the correction is extended to the fringing. This is made possible by the discovery and observation that purple fringing is created in the direction of the chromatic aberration and is more pronounced in the direction of the chromatic aberration.

A detailed explanation follows as to how chromatic aberrations and purple fringing are detected and corrected in accordance with various embodiments, as well as specific implementation details for various embodiments.

In this description, numerous specific details are set forth. However, it is understood that embodiments of the invention may be practiced without these specific details. In other instances, well-known, structures and techniques have not been shown in detail in order not to obscure the understanding of this description.

Reference throughout the specification to "one embodiment" or "an embodiment" or "certain embodiments" means that a particular feature, structure, or characteristic described in connection with the embodiment or embodiments is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, any claims following the Detailed Description are hereby expressly incorporated into this Detailed Description, with each claim standing on its own as a separate embodiment.

The embodiments are applicable in a variety of settings in which chromatic aberrations and purple fringing are identified and corrected.

Chromatic Aberrations

The following part of this document deals with the lateral chromatic aberrations. Certain embodiments include two main operations; calibration and correction. Calibration is performed for a pair camera/lens and correction uses the calibration data to remove the color artifacts.

Calibration

Calibration involves detection of measurement points in certain embodiments. A test image such as that illustrated at FIG. 4A is for aberration correction consists of array of white dots. FIG. 4B illustrates spots from another example of a test target surrounded by yellow regions of interest and with marked red and blue displacements (red and blue lines respectively). FIG. 4C illustrates lateral chromatic aberration in color displacements of white spots and around black circles in the test target of FIG. 4A. Although correction is discussed further below, FIG. 4D illustrates a processed version of FIG. 4C with the color displacements corrected in the white spots and around the black circles to illustrate the effect.

When the test image of FIG. 4A, for example, is photographed, on the final image can be seen white dots with color fringes resulting from chromatic aberration. To measure magnitude of the displacement between channels, algorithm first must find regions of the image where the displacement can be measured, namely white spots.

In certain embodiments, one step of detection includes thresholding, in order to distinguish between noisy black background and regions of interest. A thresholded image is then traversed in a search of white points. Once point is found, algorithm checks its surroundings to determine if found pixel is a part of spot or line. If found pixel is a part of the spot, 16×16 pixels region of interest (ROI) is placed over that spot and pixels under ROI are excluded from further search. All found ROIs are added to a dynamic list.

Measurement of Aberration

For each ROI, a temporary buffer of 160×160 pixels may be allocated. The buffer is then filled with the magnified potion of the image lying under currently processed ROI. A linear interpolation may be used in one embodiment for the sake of simplicity, and in certain embodiments, as it has been shown in experiments, this level of accuracy is sufficient.

In the next step, each color channel is thresholded individually to create a map of coverage for spots in RGB channels. For each spot in each channel, a centre of mass is calculated and displacements between centers RG and BG are treated as magnitudes of aberration at this location in picture. Since in this embodiment this calculation is done for 10× enlarged portion of the image, displacement is calculated with 0.1 pixel accuracy.

In accordance with certain embodiments, FIGS. 5A-5B illustrate aberration maps that may be used to determine magnitudes of color misalignments calculated for color shifts, e.g., for blue in FIG. 5A and for red in FIG. 5B with respect to the green channel for a focal length of 18 mm and F#5 aperture.

Interpolation of the Scattered Data

Since locations of points, for which aberration was measured, cannot reasonably be predicted due to misalignment between test target and a camera, and due to geometric distortion of a lens, they are treated as scattered data points. This makes the interpolation task more complicated, because for each pixel of an image, the algorithm is searched in a certain neighborhood to find nearest data points.

However, exact locations of data points cannot be reasonably predicted, as they lay on a regular grid distorted by some small errors. To reduce the search domain, the following approach may be advantageously used:

A mean distance between data points is estimated.

Data points are organized into a rectangular array, where index for array (idxX) is calculated using original position (x) of data point divided by grid spacing (S) reduced by small value.

$$idxX = \frac{x}{S + \Delta}.$$

This array reduces search domain substantially.

Inversed Distance Weighted (IDW) method is then used to estimate displacement for every pixel in the processed image. More complex algorithms may be used, but this is sufficient when data values are changing slowly across the image.

A result of this step is a vector field containing RG and BG displacements for each pixel in the image.

A new improved version of this interpolation algorithm has been developed. There are at least two advantages to doing that: reduction of data size to be stored and improved efficiency of the algorithm. Data for one focal length may take 188 kB of memory versus over 180 MB in the previous version. Improvement in interpolation speed is enormous. In the current version, interpolation takes about 2 ms (to the storage size) versus over 10 s in previous version.

The new algorithm exploits the fact that values of displacements vary slowly over the image and data points are not completely random, but have certain structure. Because of small variations of displacement, there is no necessity to store data for every pixel. Arrays with data may be shrunken by a certain factor (in experiments, it was 16 times; however at least 2, 4, 8 and 32 may also be used), and filled with available data. In such created matrix, distances between data points are small enough, to apply modified algorithm of linear interpolation. Algorithm uses variable spacing between data points. A example of the structure of the algorithm according to certain embodiments for one row of a data array is as follows:

1. Find a first point containing data in current row and store its value.
2. Find a second/next point containing data and store its value.
3. Apply linear interpolation to empty points between data points.
4. Substitute a value of the last point to the value of first point.
5. Go to 2.

After filling all rows, except rows that do not contain valid data points, an operation may be performed for columns.

Upsampling of the displacement data to the size of corrected image takes less than 0.5 seconds.

The performance of a correction algorithm using displacement data prepared with this new method may or may not be visually the same as with the old interpolation method. Small differences can be seen after calculating a difference image. However, the old algorithm cannot be assumed to be correct for interpolation of scattered data points.

FIG. 7 is a block diagram illustrating an example of a calibration module in accordance with certain embodiments. A test target image is used to find detected calibration points. These are used as input to an aberration measurement and interpolation component. Displacement vectors are determined and an aberration map is stored.

Chromatic Aberration Correction

For each pixel of the corrected image two vectors containing RG and BG displacements are available. R and B components are treated as independent grayscale images. Two temporary buffers are created to store corrected data. The correction process may be performed as follows (for one channel):

Find a displacement for the current pixel in a temporary buffer.

Treat displacement as a relative position on a source buffer.

Since displacement can be fractional, interpolate value using 5×5 sinc filter.

Store interpolated value into temporary buffer.

Go to the next pixel.

After correction both R and B channels, their data are replaced with the data stored in temporary buffers.

Purple Fringing (Fringing)

As noted above, one embodiment addresses purple fringing though the discovery and observation that fringing is created in the direction of chromatic aberration and is stronger in the areas with higher chromatic aberration. The way in which the R and B values are changed is described below. The correction ratio can vary between 0 and 1. Value 0 means that a current component remains the same, while value I means that the component will have value of G component. For example, if we have a correction ratio corR, the new value for red channels will be calculated as follows:

$$R'=R+(G-R)\cdot corR$$

where R' is a new component value and letters without prime denote initial values. The same is applied for the blue channel. The correction process is controlled by a correction ratio calculated independently for the red and the blue components. The correction ratio includes two terms. The first term $C_k$ depends on a difference between component values before and after chromatic aberration correction:

$$C_r = \frac{(\text{clamp}(|R(x, y) - R_c(x, y)|, 10))}{10}$$

where R is the original value of the red component, $R_c$ is the red value after chromatic aberration correction and clamp) (.,.) is a clamping function that returns a second value if the first value exceeds it. The first term for the B channel is calculated analogically. The value of this term may vary from 0 to 1. The second correction term is common for two channels and depends on a difference between R and B values after chromatic aberration correction. This term limits correction to the shades of purple for which the difference between R and B is small. This term may be defined as follows:

$$C_{RB} = \left\{ \begin{array}{c} \dfrac{\cos\left(\left\|\dfrac{R_c(x,y)-}{B_c(x,y)}\right\|\right)\pi/200+1}{2} \quad \text{for } \left(\left\|\dfrac{R_c(x,y)-}{B_c(x,y)}\right\|\right) < 200 \\ 0 \end{array} \right\}$$

This formula forms an S-shaped correction curve with value 1 for the difference equal to 0 and value 0 for differences above 200. The complexity of the formula has no meaning for the speed of correction because it can be pre-calculated and values may be stored in an array. A final correction term is calculated in certain embodiments by multiplication of the color dependent term and the RB difference term:

$$\text{cor}_R = C_R \cdot C_{RB}$$

$$\text{cor}_B = C_B \cdot C_{RB}$$

To prevent the corrected image from having color corruption, correction is applied under the following condition: G<R' & R'<B' for the red channel correction and G<R' & R'<B' for the blue channel.

In accordance with one embodiment, data processing is affected using a digital processing system (DPS). The DPS may be configured to store, process, and communicate a plurality of various types of digital information including digital images and video.

As discussed above, embodiments may employ a DPS or devices having digital processing capabilities. Exemplary components of such a system include a central processing unit (CPU), and a signal processor coupled to a main memory, static memory, and mass storage device. The main memory may store various applications to effect operations of the invention, while the mass storage device may store various digital content.

The DPS may also be coupled to input/output (I/O) devices and audio/visual devices. The CPU may be used to process information and/or signals for the processing system. The main memory may be a random access memory (RAM) or some other dynamic storage device, for storing information or instructions (program code), which are used by the CPU. The static memory may be a read only memory (ROM) and/or other static storage devices, for storing information or instructions, which may also be used by the CPU. The mass storage device may be, for example, a hard disk drive, optical disk drive, or firmware for storing information or instructions for the processing system.

FIG. 8 is a block diagram illustrating an example of a correction module in accordance with certain embodiments. Inputs to an LCA correction component include an aberrated image and an interpolated map generated from aberration maps using interpolation according to camera aperture and focal length. Then, purple fringing correction is applied and a corrected image is generated, stored, displayed, transmitted, output, etc.

FIG. 9 is a flow diagram illustrating an example of a purple fringing correction process in accordance with certain embodiments. Correction ratios for red and blue are calculated. A correction ratio may be calculated based on a difference between color component values before and after chromatic aberration correction. A correction ratio will have a value that falls in a range between zero and one. It is then checked whether the color falls within a proper range. This prevents colors that do not belong to fringes from corruption. If the color is in the proper range, then red and blue components are scaled towards green according to the correction ratio. If the correction ratio is zero, then the component remains unchanged. For correction ratios that are one, the corrected component will be given the green component value. Corrected values are stored.

General Matters

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central site or, alternatively, one or more operations may be performed elsewhere.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

In addition, processes and methods have been described in certain orders for typographical purposes. These do not imply that such ordering is necessary, and steps may be performed in a different order unless it is expressly described that a certain order is necessary or those skilled in the art recognize that a certain ordering is necessary.

What is claimed is:

1. A processor-implemented method of correcting lateral chromatic aberrations in digital images within a digital image acquisition device, comprising:
    calibrating a camera-lens pair;
    acquiring a digital image;
    correcting lateral chromatic aberrations within the digital image, including:
        finding a displacement for a current pixel in a temporary buffer;
        designating the displacement as a relative position in a source buffer;
        interpolating a displacement value, comprising:
            estimating a mean distance between data points,
            organizing the data points into a rectangular array, and estimating said displacement value by inverse distance weighting;

storing interpolated displacement value in the temporary buffer; and repeating for next one or more pixels and end after last pixel; and outputting, storing, displaying, projecting, or transmitting a corrected digital image which has been corrected for lateral chromatic aberrations in two dimensions, or a further processed version of the digital image, or combinations thereof.

2. The method of claim 1, wherein the calibrating comprises:

detecting measurement points of a test image;
measuring aberration; and
interpolating scattered data.

3. The method of claim 2, wherein the measuring aberration comprises thresholding.

4. The method of claim 2, wherein the calibrating further comprises:

finding and storing first and second data points in a first dimension;

applying linear interpolation to empty points between the first and second data points;

substituting value of second point to value of first point; and increment a second dimension and repeat one or more times.

5. The method of claim 1, wherein the interpolating comprising applying a sinc filter.

6. The method of claim 5, wherein the sinc filter comprises a 5×5 sinc filter.

7. A processor-implemented method of correcting lateral chromatic aberrations in digital images within a digital image acquisition device according to claim 1, wherein the method further comprises calculating corrected values for red (R) and blue (B) color channels as follows:

R'=R+(G−R)×corR; B'=B+(G−B)×corB; where corR and corB are selected correction ratios for the red and blue color channels, respectively.

8. The method of claim 7, wherein the selected correction ratios corR and corB comprise:

$$CorR = \{CR = 0.1 \times \text{clamp}([R(x,y) - RC(x,y)], 10)\} \times CRB;$$
and $$CorB = \{CB = 0.1 \times \text{clamp}([B(x,y) - BC(x,y)], 10)\} \times CRB;$$

where clamp (.,.) returns second term when first term exceeds it; and $$CRB = 1 + \cos[abs(Rc(x,y) - Bc(x,y))\pi/200], \text{ when } abs(Rc(x,y) - Bc(x,y)) \leq 200; \text{ and}$$

$$CRB = 0 \text{ when } abs(Rc(x,y) - Bc(x,y)) < 200.$$

9. The method of claim 7, further comprising applying color corruption correction when G<R' and R'<B'.

10. The method of claim 1, wherein the interpolating comprises selecting a pixel neighborhood and performing the method in a single pass.

11. One or more non-transitory processor readable media having code embedded therein for programming a processor to perform a method of correcting lateral chromatic aberrations in digital images, wherein the method comprises:

calibrating a camera-lens pair;
acquiring a digital image;
correcting lateral chromatic aberrations within the digital image, including:
finding a displacement for a current pixel in a temporary buffer;
designating the displacement as a relative position in a source buffer;
interpolating a displacement value, comprising:
estimating a mean distance between data points,
organizing the data points into a rectangular array, and
estimating said displacement value by inverse distance weighting;
store interpolated displacement value in the temporary buffer; and
repeat for next one or more pixels and end after last pixel.

12. The one or more non-transitory processor-readable media of claim 11, wherein the calibrating comprises:

detecting measurement points of a test image;
measuring aberration; and
interpolating scattered data.

13. The one or more non-transitory processor-readable media of claim 12, wherein the measuring aberration comprises thresholding.

14. The one or more non-transitory processor-readable media of claim 12, wherein the calibrating further comprises:

finding and storing first and second data points in a first dimension;

applying linear interpolation to empty points between the first and second data points;

substituting value of second point to value of first point; and increment a second dimension and repeat one or more times.

15. The one or more non-transitory processor-readable media of claim 11, wherein the interpolating comprising applying a sinc filter.

16. The one or more non-transitory processor-readable media of claim 15, wherein the sinc filter comprises a 5×5 sinc filter.

17. One or more non-transitory processor readable media according to claim 11, wherein the method comprises calculating corrected values for red (R) and blue (B) color channels as follows:

R'=R+(G−R)×corR; B'=B+(G−B)×corB; where corR and corB are selected correction ratios for the red and blue color channels, respectively.

18. The one or more non-transitory processor-readable media of claim 17, wherein the selected correction ratios corR and corB comprise:

$$CorR = \{CR = 0.1 \times \text{clamp}([R(x,y) - RC(x,y)], 10)\} \times CRB;$$
and $$CorB = \{CB = 0.1 \times \text{clamp}([B(x,y) - BC(x,y)], 10)\} \times CRB;$$

where clamp (.,.) returns second term when first term exceeds it; and $$CRB = 1 + \cos[abs(Rc(x,y) - Bc(x,y))\pi/200], \text{ when } abs(Rc(x,y) - Bc(x,y)) \leq 200; \text{ and}$$

$$CRB = 0 \text{ when } abs(Rc(x,y) - Bc(x,y)) < 200.$$

19. The one or more non-transitory processor-readable media of claim 18, wherein the method further comprises applying color corruption correction when G<R' and R'<B'.

20. The one or more processor-readable media of claim 11, wherein the interpolating comprises selecting a pixel neighborhood and performing the method in a single pass.

21. A portable digital image acquisition device comprising a lens, an image sensor, a processor, and one or more processor readable media having code embedded therein for programming the processor to perform a method of correcting lateral chromatic aberrations in digital images, wherein the method comprises:
- calibrating a camera-lens pair;
- acquiring a digital image;
- correcting lateral chromatic aberrations within the digital image, including:
  - finding a displacement for a current pixel in a temporary buffer;
  - designating the displacement as a relative position in a source buffer;
  - interpolating a displacement value, comprising:
    - estimating a mean distance between data points,
    - organizing the data points into a rectangular array, and estimating said displacement value by inverse distance weighting;
  - storing interpolated displacement value in the temporary buffer; and
  - repeating for next one or more pixels and end after last pixel; and
- outputting, storing, displaying, projecting, or transmitting a corrected digital image which has been corrected for lateral chromatic aberrations, or a further processed version of the digital image, or combinations thereof.

22. The device of claim 21, wherein the calibrating comprises:
- detecting measurement points of a test image;
- measuring aberration; and
- interpolating scattered data.

23. The device of claim 22, wherein the measuring aberration comprises thresholding.

24. The device of claim 22, wherein the calibrating further comprises:
- finding and storing first and second data points in a first dimension;
- applying linear interpolation to empty points between the first and second data points;
- substituting value of second point to value of first point; and
- increment a second dimension and repeat (ii)-(v) one or more times.

25. The device of claim 21, wherein the interpolating comprising applying a sinc filter.

26. The device of claim 25, wherein the since filter comprises a 5×5 sinc filter.

27. A portable digital image acquisition device comprising a lens, an image sensor, a processor, and one or more processor readable media having code embedded therein for programming the processor to perform a method of correcting lateral chromatic aberrations in digital images according to claim 21, wherein the method comprises calculating corrected values for red (R) and blue (B) color channels as follows:

$R'=R+(G-R)\times corR$; $B'=B+(G-B)\times corB$; where corR and corB are selected correction ratios for the red and blue color channels, respectively.

28. The device of claim 27, wherein the selected correction ratios corR and corB comprise:

$$CorR=\{CR=0.1\times \text{clamp}([R(x,y)-RC(x,y)],10)\}\times CRB;$$
and
$$CorB=\{CB=0.1\times \text{clamp}([B(x,y)-BC(x,y)],10)\}\times CRB;$$

where clamp (.,.) returns second term when first term exceeds it; and $$CRB=1+\cos[abs(Rc(x,y)-Bc(x,y))\pi/200, \text{ when } abs(Rc(x,y)-Bc(x,y))\leq 200; \text{ and}$$

$$CRB=0 \text{ when } abs(Rc(x,y)-Bc(x,y))<200.$$

29. The device of claim 28, wherein the method further comprises applying color corruption correction when G<R' and R'<B'.

30. The device of claim 21, wherein the interpolating comprises selecting a pixel neighborhood and performing the method in a single pass.

* * * * *